March 1, 1955  C. R. ADAIR  2,703,044
DIGGER APPARATUS
Filed Jan. 14, 1949  3 Sheets-Sheet 2
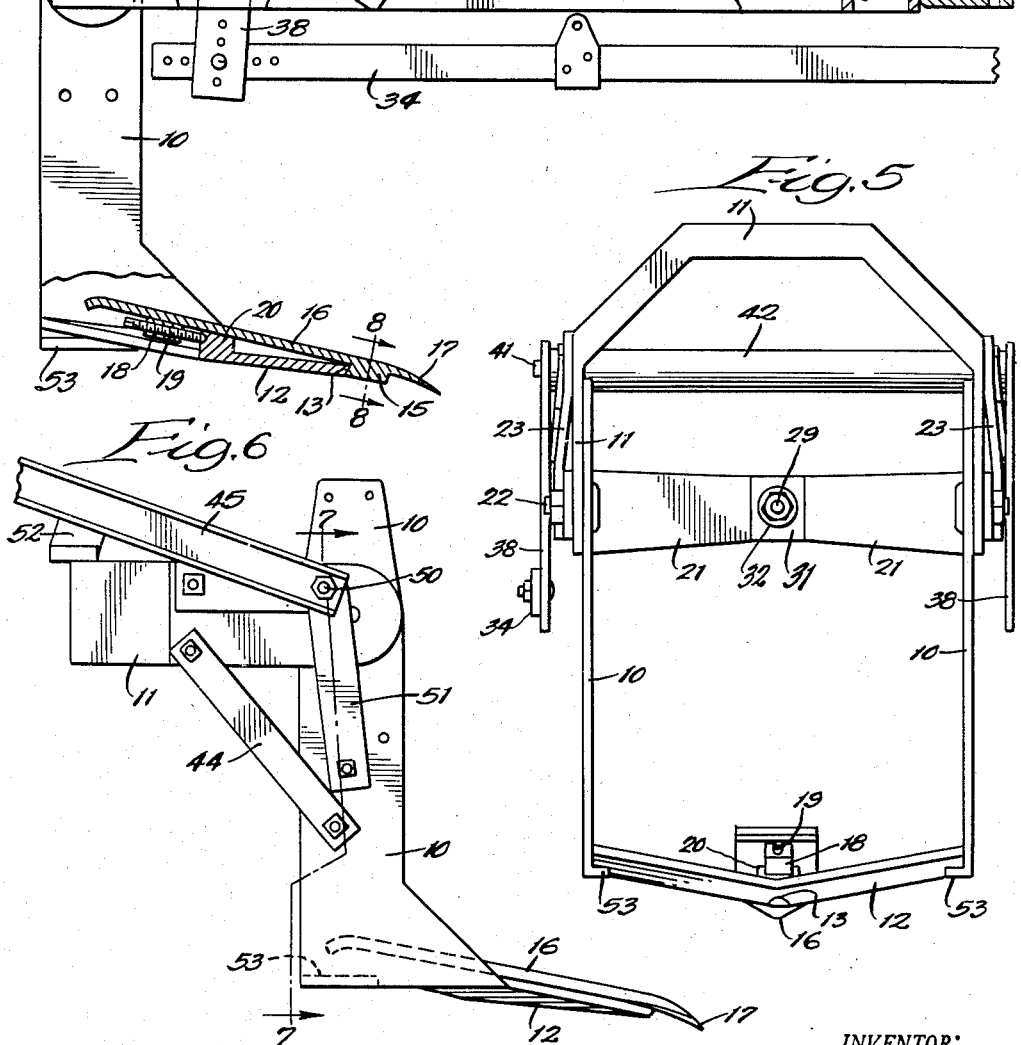
INVENTOR:
Charles R. Adair,
By Dawson, Ooms, Brothers & Spangenberg,
Attorneys.

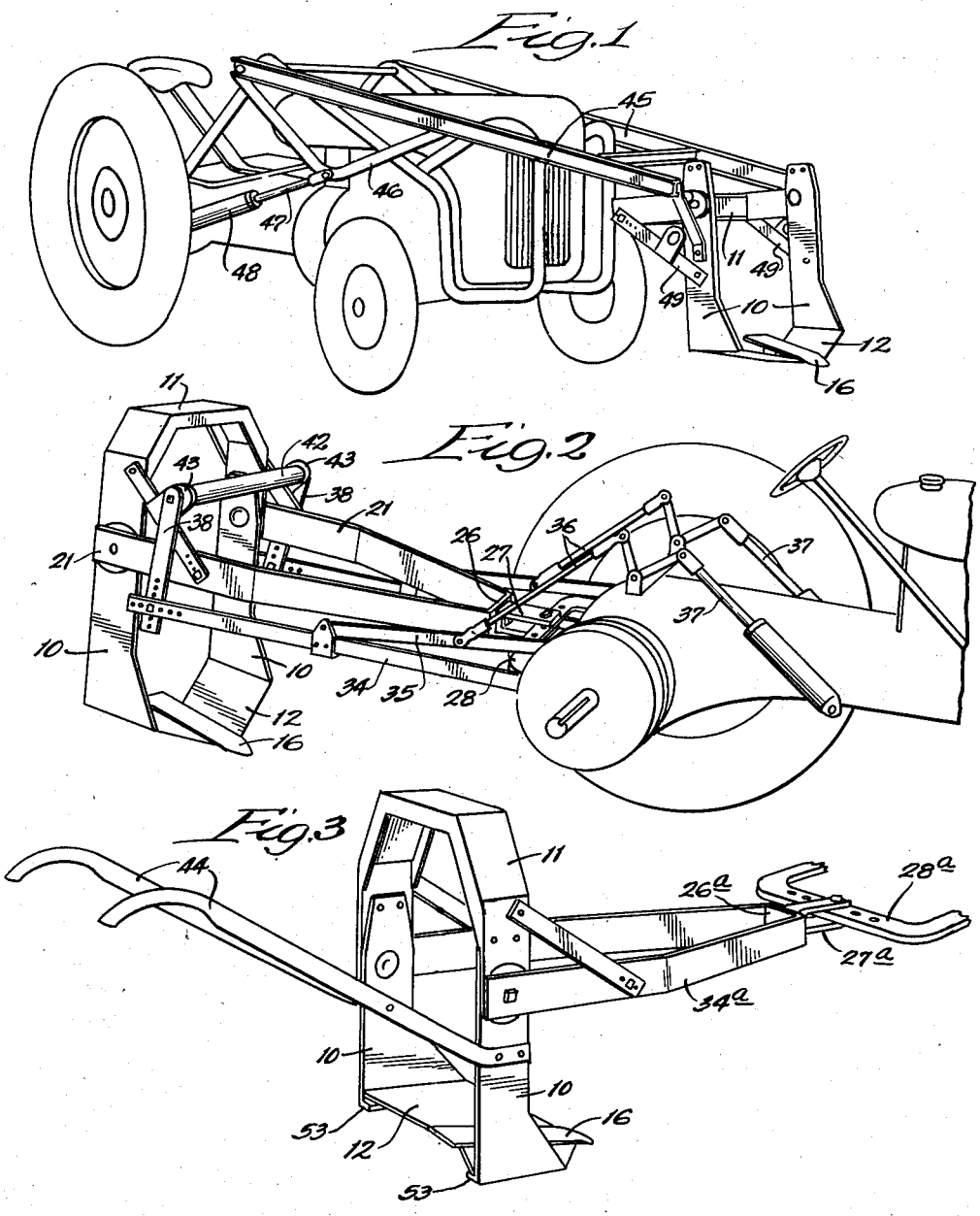

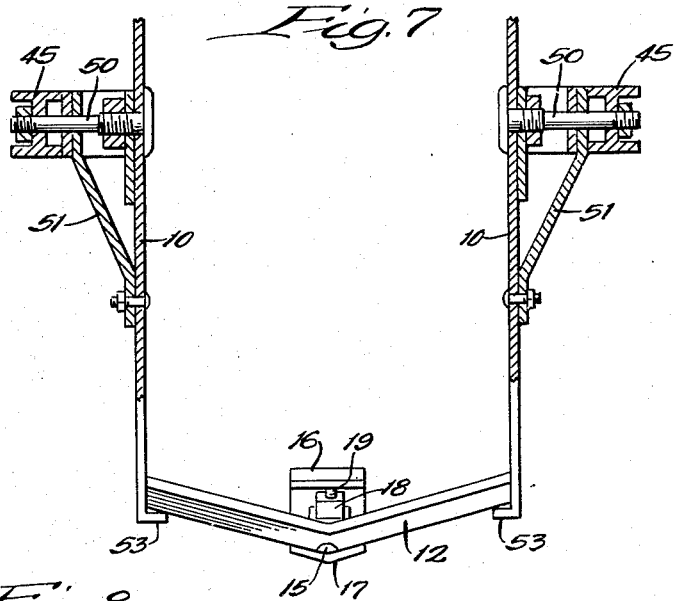
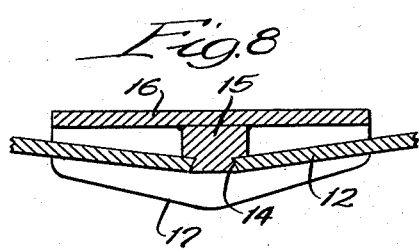
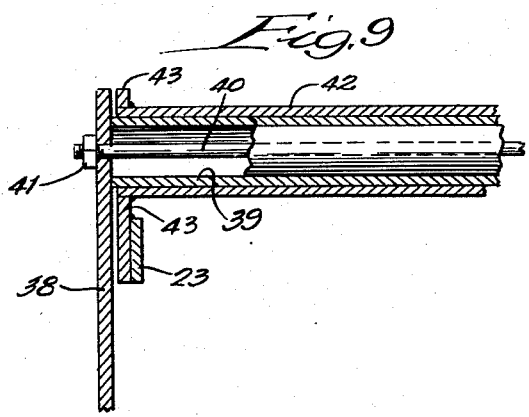

United States Patent Office 2,703,044
Patented Mar. 1, 1955

2,703,044

DIGGER APPARATUS

Charles R. Adair, Chicago Heights, Ill.

Application January 14, 1949, Serial No. 70,976

5 Claims. (Cl. 97—226.1)

This invention relates to digger apparatus and is particularly useful in the digging of shrubs, trees, and in subsoil plowing. The apparatus is useful not only in digging below the shrubs, trees, etc., but also in elevating the same together with attached soil for placing upon a truck, etc. Other uses will be obvious.

An object of the invention is to provide digger apparatus of novel structure effective for digging shrubs, trees, etc., and for subsoil plowing. Yet another object is to provide digger apparatus having angular cutting edges which do not clog and which are effective for cutting roots without mutilating while also lifting the trees or shrubs onto a truck. Yet another object is to provide such an apparatus effective for digging shrub holes or trenches for heeling in nursery stock, grubbing and piling brush, and subsoil plowing, etc. Yet another object is to provide a digger device of novel structure equipped with angular cutting edges and a combination point and lifting shoe and also with heelplates which function to maintain the cutter at a desired depth without drifting, etc. Still another object is to provide connections between the cutter and tractor means including adaptor pins, and connections between the cutter and hydraulic lifting booms including pivotally mounted bars and sleeves. Other specific objects and advantages will appear as the specification proceeds.

Broadly, the digger is designed for the purpose of cutting underneath and on each side of a shrub or tree and slightly raising it from its normal position so that the shrub or tree may be lifted out of the ground with a minimum of manual labor. The digger is a combination tool which may be employed in front of or behind the tractor with connections making it effective for digging low shrubs, or for digging trees, for subsoil plowing, etc.

The invention is illustrated in specific embodiments, by the accompanying drawings, in which—

Fig. 1 is a perspective view of apparatus embodying my invention, the digger being shown supported upon the lifting booms of a tractor; Fig. 2, a perspective view of the digger apparatus connected with draft bars for drawing behind a tractor, connection being provided for lifting the digger with respect to the tractor; Fig. 3, a perspective view of the digger apparatus shown in Fig. 2 connected to the tractor draw bar, the digger apparatus being shown equipped with handlebars; Fig. 4, a broken side view in elevation on an enlarged scale of the digger apparatus shown in Fig. 2; Fig. 5, a rear view of the structure shown in Fig. 4; Fig. 6, a side view in elevation of the digger apparatus illustrated in Fig. 1; Fig. 7, a detail sectional view, the section being taken as indicated at line 7 of Fig. 6; Fig. 8, a transverse sectional detail view, the section being taken as indicated at line 8 of Fig. 4; and Fig. 9, broken detail sectional view, the section being taken as indicated at line 9 of Fig. 4.

In the illustration given more particularly in Figs. 2, 4, 5, 8 and 9, 10 designates the metal side walls of the digger which are connected at their tops by the arch 11. The arch portion 11 is pivotally connected to the side walls 10. A cutter 12 connects the lower ends of the side walls 10 and preferably the cutter is V-shaped in cross section and is welded at its edges to the side wall plates 10. The cutter 12 thus provides angular cutting edges and the cutter is preferably pitched downwardly and forwardly, as shown best in Fig. 4.

At the forward end of the cutter bottom 12 is a recess having bevelled side walls as indicated at 13 in Fig. 4, and 14 in Fig. 8. The recess thus provided is adapted to receive a shoe lug 15 having bevelled walls locked within the recess, as shown best in Figs. 4 and 8. The lug 15 is preferably formed integrally with a combination point and lifting shoe 16 which preferably has a point 17 extending forwardly of the cutter 12, as shown best in Fig. 4. The shoe 16 extends rearwardly over the V-portion of the cutter and is provided at its lower rear side with a threaded lug 18 for receiving the locking screw 19. The locking screw 19 has a forward end receivable within a recess in a lug 20 welded to the top control portion of the cutter 12, as shown best in Fig. 4. After the portion 15 has been received within the recess provided by bevelled walls 13 and 14, the screw 19 is extended inwardly, as illustrated in Fig. 4, so as to have its forward tapered end engaging the tapered face of the recess wall of lug 20, thus locking the shoe 16 firmly in position.

In the modification shown in Figs. 2, 4, 5, 8 and 9, I equip the side walls 10 with the forwardly extending beams 21 and employ the pivot shafts 22 for connecting these members to side walls 10, the pivot shafts 22 serving also to connect the arch structure 11 to the side walls 10. Brace bars 23 are connected to the arch 11 and also with the beams 21. Preferably each bar 23 is provided with spaced adjustment openings 24 adapted to receive a bolt 25 to permit angular adjustment between the arch member 11 and beams 21.

The beams 21 are tapered inwardly and joined at 26. Here they are connected to the link 27 secured to the tractor draw bar 28, as shown more clearly in Figs. 2 and 4. A rod 29 equipped with a head 30 extends through the wall 26 and a spaced wall 31 and is equipped with a nut-held head 32 engaging the compression spring 33. It will be understood that any suitable means for connecting the draw beams 21 with the draw bar of the tractor may be employed.

Any suitable means for lifting the drawn digger apparatus may be employed.

In the illustration given, I provide lifting booms 34 secured by bars 35 to the toggle lifting arms 36 which are in turn actuated by hydraulic piston stems 37, as shown more clearly in Fig. 2. Since such lifting apparatus is of well known construction, a detailed description is believed here to be unnecessary. The rear end of the lifting booms 34 are adjustably connected to the swing arms 38, as shown more clearly in Figs. 2 and 4. The arms 38 are secured to an inner tube 39, as shown more clearly in Fig. 4, by welding or by other suitable means, and a rod 40 equipped with threaded ends engaged by nuts 41 may also be employed for this purpose. The tube 39 is received within the sleeve 42 welded to the supporting ears 43, as shown more clearly in Figs. 4 and 9. The ears 43 are in turn welded to the brace straps 23, as shown more clearly in Figs. 4 and 9.

In the operation of the structure shown in Figs. 2, 4, 5, 8 and 9, the tractor moves forwardly and the cutter 12 following the lifting shoe 16 enters the soil, the cutter or cutter edges 12 sinking deeper into the ground and passing under the crown roots of the shrubs, etc. The tractor operator then applies the hydraulic power, causing a lifting of the booms 34 and of the cutter. The shrubs, etc., containing dirt clinging to the roots are lifted clear of their setting and may be placed in a truck, etc. This is accomplished without mutilating the roots, etc. In the lifting operation, the boom 34 permits the tube 39 to swing within the sleeve 42 and an effective lifting operation is brought about.

In the modification illustrated in Fig. 3, the structure is substantially identical with that shown in Fig. 2, except that the lifting booms 34 and associated apparatus are omitted, and the forward walls 26a of the beams 34a are connected directly to the link 27a of the tractor draw bar 28a. Instead of employing a lifting boom, I equip the side walls 10 of the cutter with handlebars 44. By means of the handlebars, the operator can direct the pitch of the cutter as it enters the ground and also direct the movement of the cutter within the ground. After emerging from the soil, the operator can tilt the cutter apparatus laterally so as to allow it to lie upon its side.

Referring to the structure shown in Figs. 1, 6 and 7, here the cutter apparatus is adapted for support upon the lifting booms 45 extending forwardly of the tractor, and the structure thus provided is particularly useful for uprooting and lifting trees, etc. The lifting booms 45 are carried upon arms 46 actuated by the plunger stems 47 of the hydraulic cylinders 48, as shown more clearly in Fig. 1. Since such structure is old per se and no claim to such alone is made herein, a further detailed description is believed unnecessary.

To secure the side walls 10 upon the booms 45, I prefer to employ the means illustrated in Fig. 7. In this structure, the arch 11 is swung rearwardly, as shown best in Fig. 1, and is supported in such rearwardly turned position by the brace straps 49. Adaptor pins 50 are extended through the side walls 10 and through the lifting booms 45, as shown more clearly in Fig. 7. Metal straps 51 are bolted to the side walls 10 and extend upwardly and are apertured at their tops to receive the adaptor pins 50. By this means an extremely sturdy and rigid structure is provided. If desired, the lifting booms 45 may be connected further by a cross strap 52 to rigidly unite them.

In the operation of the structure shown in Figs. 1, 6 and 7, the booms 45 are lowered until the cutting edges rest on the ground about 4 feet or so from the base of the tree. As the tractor moves forward the blades sink deeper into the ground and extend under the crown roots. The tractor operator then applies the hydraulic power and lifts the tree with the dirt clinging to the roots thereof clear of its setting. He may then move the tractor to the side of a truck and deposit the tree and the root soil within the latter truck. This operation is carried out without mutilating the roots or damaging the bark of the tree or, in the event of a large shrub, of injuring the shrub.

In each of the structures illustrated, I prefer to equip the cutter 12 near its rear with a heelplate 53 on each side therof. The heelplates function as effectively as the heel on the land side of a walking plow. After the draw bar is properly adjusted, the lifter will run at the desired depth without drifting.

It will be understood that the new cutter apparatus may be employed with or without the lift mechanism. If desired, the shrubs may be removed from the ground immediately after digging or they may be left in loosened condition for removal some time later when this is desired. The digging, while loosening the soil and freeing the shrubs, still does not topple them out of the ground.

In the foregoing structure it will be noted that the digger apparatus is converted readily from a tree digger to a draft digger, the arch 11 providing a sturdy support for the structure in either position and being tiltable about its axis to the positions illustrated more clearly in Figs. 2 and 6.

The angular cutting edges of the cutter 12 have been found to be unusually effective in the cutting operation. They cut roots freely and do not clog and draft is extremely light.

The apparatus, in addition to functioning as a tree digger or shrub digger, is also useful for sub-soil plowing and for this latter operation the parts are preferably made somewhat heavier than as described. Further, the apparatus is useful for forming ditches into which shrubs may be placed and for many other obvious uses.

While in the foregoing specification, I have set forth certain structures in considerable detail for the purpose of illustrating single embodiments of the invention, it will be understood that such details may be varied widely by those skilled in the art without departing from the spirit of my invention.

I claim:

1. In a digger apparatus, the combination comprising vertically extending, transversely spaced side frame members, an arch member connecting said side members at the top and movably secured thereto by means permitting said arch member to be moved to an upwardly extending position and to a rearwardly extending position with respect to said members, means for rigidly securing said arch member in each of said two positions, a cutter plate extending between the lower portions of said side members and having a forwardly facing cutting edge, and inwardly extending heel plates secured beneath said cutter plate at the outer edge portions thereof.

2. In a digger apparatus, the combination comprising vertically extending, transversely spaced side frame members formed of thin plates positioned in facing relation to each other, an arch member connecting said side members at the top and pivotally secured thereto, said arch member being pivotable to an upwardly extending position in alignment with said side members and to a rearwardly extending position substantially at right angles to said side members, a cutter plate extending between the lower portions of said side members and having a forwardly extending cutting edge, and heel plates secured beneath said cutter plate at the outer edges thereof.

3. In a digger apparatus, the combination comprising vertically extending, transversely spaced side frame members, an arch member connecting said side members at the top and extending rearwardly from said side members, means for rigidly securing said arch member in said rearwardly extending position, a cutter plate extending between the lower portions of said side members and having a forwardly facing cutting edge, and heel plates secured beneath said cutter plate providing generally horizontal bearing surfaces.

4. In a digger apparatus, the combination comprising vertically extending, transversely spaced side frame members, a cutter plate secured to and extending between the lower portions of said side members and having a forwardly facing cutting edge, said cutter plate being inclined downwardly and inwardly, a shoe supported centrally upon said cutter plate and inclined downwardly and forwardly with respect thereto, an arch member connecting said side members at the top and pivotally secured thereto, said arch member being pivotable to an upwardly extending position and to a rearwardly extending position with respect to said side members, means for rigidly securing said arch member in each of said two positions, and heel plates secured beneath said cutter plate at the outer edges thereof and lying in a plane at substantially the same depth as the portions of the forward cutter edge immediately in front of said heel plates.

5. In a digger apparatus, the combination comprising vertically extending, transversely spaced side frame members, a cutter plate secured to and extending between the lower portions of said side members, said cutter plate being substantially V-shaped and being inclined downwardly and forwardly with respect to said side members, a shoe supported centrally on said cutter and inclined downwardly and forwardly to said cutter plate, an arch member connecting said side members at the top and pivotally secured thereto, said arch member being pivotable to an upwardly extending position aligned with said side members and to a rearwardly extending position substantially at right angles thereto, brace members securing said arch member in each of said two positions, and heel plates secured beneath said cutter plate and providing bearing surfaces lying in a generally horizontal plane.

References Cited in the file of this patent

UNITED STATES PATENTS

| Number | Name | Date |
|---|---|---|
| 326,462 | Torrey | Sept. 15, 1885 |
| 1,095,404 | Koepke | May 5, 1914 |
| 1,190,055 | Wick | July 4, 1916 |
| 1,205,416 | Trout | Nov. 21, 1916 |
| 1,509,499 | Thompson et al. | Sept. 23, 1924 |
| 1,641,032 | Gibbs | Aug. 30, 1927 |
| 1,840,126 | Palmer | Jan. 5, 1932 |
| 1,894,516 | Karstedt | Jan. 17, 1933 |
| 1,909,752 | Calkins | May 16, 1933 |
| 1,938,952 | Cole et al. | Dec. 12, 1933 |
| 2,295,458 | Edwards | Sept. 8, 1942 |
| 2,322,115 | Cox et al. | June 15, 1943 |